United States Patent [19]

Frie et al.

[11] 4,121,542

[45] Oct. 24, 1978

[54] METHOD AND APPARATUS FOR OPERATING AN INTERNAL COMBUSTION ENGINE

[75] Inventors: Wolfgang Frie; Hans-Joachim Henkel, both of Erlangen; Paul Hini, Erlangen-Kosbach; Christian Koch, Nurnberg-Grossgründlach; Eugen Szabo De Bucs, Erlangen, all of Germany

[73] Assignee: Siemens Aktiengesellschaft, Berlin and Munich, Germany

[21] Appl. No.: 633,609

[22] Filed: Nov. 20, 1975

Related U.S. Application Data

[63] Continuation-in-part of Ser. No. 439,870, Feb. 6, 1974, abandoned.

[30] Foreign Application Priority Data

Feb. 7, 1973 [DE] Fed. Rep. of Germany ....... 2306026

[51] Int. Cl.² ............................................. F02B 43/08
[52] U.S. Cl. .................................... 123/3; 123/119 A
[58] Field of Search ................ 123/1 A, 3, 34, 119 A, 123/119 E, 133; 48/212, 107

[56] References Cited

U.S. PATENT DOCUMENTS

| | | | |
|---|---|---|---|
| 2,201,965 | 5/1940 | Cook | 123/3 |
| 3,059,422 | 10/1962 | White | 123/133 |
| 3,116,988 | 1/1964 | Lauder | 123/34 |
| 3,447,511 | 6/1969 | Beard et al. | 123/3 |
| 3,635,200 | 1/1972 | Rundell et al. | 123/3 |
| 3,709,203 | 1/1973 | Cettin et al. | 123/3 |
| 3,828,736 | 8/1974 | Koch | 123/119 A |
| 3,915,125 | 10/1975 | Henkel et al. | 123/3 |

Primary Examiner—Charles J. Myhre
Assistant Examiner—David D. Reynolds
Attorney, Agent, or Firm—Kenyon & Kenyon, Reilly, Carr & Chapin

[57] ABSTRACT

According to the invention, the fuel is supplied to the reformed-gas generator in an amount at least approximately proportional to the instantaneous demand of the internal-combustion engine and is mixed there, in atomized or evaporated form, with so much air and/or fed-back exhaust gas drawn in through the reformed-gas generator that for the air component of the mixture, the air number for the reaction of the fuel in the converter is at least 0.05 but not more than 0.5 and the exhaust gas component does not fall below the exhaust gas quantity equivalent to the air number 0.05 and does not exceed the exhaust gas quantity equivalent to the air number 0.5. The fuel gas mixture produced in this manner, prior to being fed to the combustion chambers of the internal-combustion engine, is mixed with enough additional air sucked in by the internal-combustion engine such that the air number for the combustion in these combustion chambers is at least equal to 1.

21 Claims, 12 Drawing Figures

METHOD AND APPARATUS FOR OPERATING AN INTERNAL COMBUSTION ENGINE

RELATED APPLICATIONS

This Application is a Continuation-In-Part of application Ser. No. 439,870 filed Feb. 6, 1974 now abandoned.

BACKGROUND OF THE INVENTION

1. Field of the Invention

The invention concerns a method and apparatus for operating an internal-combustion engine, and particularly an Otto engine employing a reformed-gas generator.

2. Description of the Prior Art

A method for operating an internal-combustion engine (hereafter referred to as "engine") particularly an Otto engine, utilizing a reformed-gas generator (hereinafter referred to as "gas converter") is already known from U.S. Ser. No. 218,696. In the method described therein, atomized or evaporated, hydrocarbon-containing fuel is fed, with an appropriate admixture of air and/or exhaust gas fed back from the engine, to the reaction chamber of the gas converter. There the mixture is converted at a catalyst, raised to a suitable elevated temperature, into a fuel gas mixture containing methane and carbon monoxide and possibly also hydrogen. This is then fed, with the admixture of additional air, to the combustion chambers of the engine. Catalysts suitable for use in the gas generator just mentiond can be the nickel or platinum catalysts mentioned in U.S. Ser. No. 218,696, or the oxide catalysts, such as those disclosed in the U.S. Ser. No. 334,932, or the U.S. Ser. No. 336,062. Use of any of the catalyst carries just enumerated makes possible a very compact design of the converters, making them suitable for installation in motor vehicles. The fuel gas generated in the converter has a high octane number and can be burned in the combustion chambers of the engine with considerably less harmful and environment-polluting residues than the liquid fuels which are customarily burned. Liquid fuels most suitable for conversion in the gas generators are those which are low in harmful substances such as lead, cyclic hydrocarbons and sulfur. Additives which increase the octane number and have a harmful effect particularly in the exhaust gases are not required in the liquid fuels that are to be used. The fuel gas mixture generated in the reformed-gas generator already has a high octane number, as already mentioned.

For proper utilization of the gas generator as a source of fuel for the engines, favorable apportioning of the substances, i.e., fuel, air and fed-back exhaust gas, participating in the reaction in the gas generator is particularly important.

In the U.S. Ser. No. 270,923, a method for apportioning the quantities of fuel, air and fed-back exhaust gas necessary for maintaining a predetermined operating temperature in the reaction chamber of the gas converter is disclosed. By different apportioning of the shares of air and exhaust gas in the air-exhaust gas mixture mixed with the fuel the temperature in the reaction chamber of the gas generator can be controlled, since the reaction of the fuel with the air takes place essentially exothermically, while the reaction of the fuel with the exhaust gas essentially endothermically. The temperature of the reaction chamber of the converter serves as the control quantity for the apportionment of the quantities of air, fuel and exhaust gas which are to be supplied to this reaction chamber. However, the fuel requirement of the engine is provided through the control of a fuel metering device which responds to the position of the throttle.

It is an object of the invention to provide a method and means for providing improved utilization of the fuel used, resulting in the greatest possible reduction of harmful substances to be emitted by the exhaust gas.

It is an additional object of this invention to provide a method and means whereby the apportioning of fuel, air and/or exhaust gas supplied to the gas generator is a function of the fuel demand requirements of the engine.

SUMMARY OF THE INVENTION

To solve this problem, the fuel is fed to the gas converter in an amount at least approximately proportional to the instantaneous demand of the internal-combustion engine as determined by the position of the gas pedal and the engine's rotational speed. It is mixed there, in atomized or evaporated form, with so much air drawn through the converter and/or so much of the fed-back exhaust gas, that for the air component of the mixture the air number for the reaction of the fuel in the reformed-gas generator is at least 0.05 but not more than 0.5 and that the exhaust gas share if any is not below the exhaust gas quantity equivalent to the air number 0.05 and not in excess of the exhaust gas quantity equivalent to the air number 0.5. The fuel gas generated, prior to being fed to the combustion chambers of the engine, is mixed with enough additional air that the air number for the combustion in the engine is at least equal to 1.

BRIEF DESCRIPTION OF THE DRAWING

Reference is now made to the accompanying drawings for a better understanding of the nature and objects of the invention. The drawings illustrate the best mode presently contemplated for carrying out the objects of the invention and its principles, and are not to be construed as restrictions or limitations on its scope. In the drawings.

DESCRIPTION OF THE PREFERRED EMBODIMENTS

Figure 1:
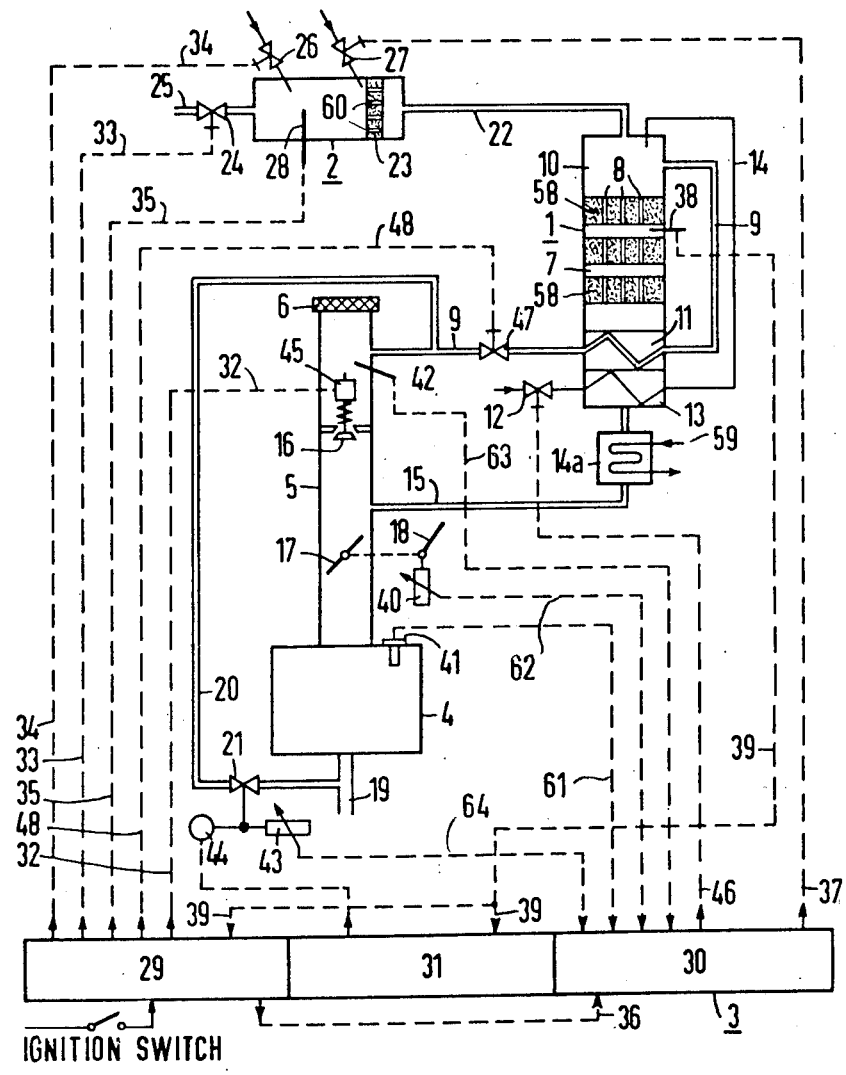
FIG. 1 shows, schematically, an embodiment of apparatus for operating an internal-combustion engine with a reformed-gas generator according to this invention.

For a better understanding of what is meant by the different air numbers and by the statement "the amount of exhaust gas equivalent to an air number", the reactions taking place in the gas converter and in internal-combustion engine will first be briefly discussed.

The combustion of a fuel can generally be represented by the following equation:

$$B + \lambda_{13} L \rightarrow A. \tag{1}$$

$B$ is here a mol of fuel, (a "mol of fuel" is defined as meaning as many grams of fuel as the mean formula weight if the fuel indicates), $L$ the quantity of air required for stoichiometric combustion of the fuel, and $A$ the amount of exhaust gas produced by the combustion. For stoichiometric combustion $\lambda_{13}$ is equal to 1; for hyperstoichiometric combustion (lean mixture) it is larger than 1. The so-called overall air number $\lambda_{13}$ therefore indicates the ratio of the overall quantity of air actually used per mol of fuel to the quantity of air required for stoichiometric combustion per mol of fuel. In the present method, the reaction of the fuel takes place in two steps. The first step, $$B + \lambda_{12} L \rightarrow S, \tag{2}$$

where $S$ is the fuel gas quantity produced per mol of fuel, takes place in the gas converter, and the second step, $$S + (\lambda_{13} - \lambda_{12}) L \rightarrow A, \tag{3}$$

during the combustion of the fuel gas $S$ in the combustion chambers of the internal-combustion engine.

The air number for the conversion of fuel in the gas converter to fuel gas is therefore $\lambda_{12}$. The air number $\lambda_{12}$ is equal to the ratio of the air quantity actually supplied to the reformed-gas generator per mol of fuel for conversion, to the air quantity required for stoichiometric combustion per mol of fuel. The air number $\lambda_{12}$, according to the invention, should not be smaller than 0.05 and not larger than 0.5.

The quantity $L$ can be eliminated from Eqs. (2) and (3). One then obtains the following reaction equation for the reaction of fuel in the gas generator with the presence of exhaust gas:

$$B + \frac{\lambda_{12}}{\lambda_{13} - \lambda_{12}} A \dashrightarrow \frac{\lambda_{13}}{\lambda_{13} - \lambda_{12}} S. \tag{4}$$

Thus one can make a fuel gas mixture of the same composition as that achieved from fuel and air by admixing fuel and exhaust gas instead. Since $\lambda_{13}/(\lambda_{13} - \lambda_{12})$ is larger than 1, one obtains somewhat more fuel gas in the case of a reaction with exhaust gas than for the reaction with air. Referred to the same amount of fuel to be reacted, the exhaust gas quantity equivalent to the air number $\lambda_{12}$ per mol of the fuel to be reacted with exhaust gas is equal to $$\lambda A = \frac{\lambda_{12}}{\lambda_{13} - \lambda_{12}} A. \tag{5}$$

$\lambda$ is here equal to the ratio of the amount of exhaust gas actually used in the reaction per mol of fuel to the amount of exhaust gas produced in the stoichiometric or hyperstoichiometric combustion of a mol of fuel. If no pure air or pure exhaust gas is admixed to the fuel in the reformed-gas generator, the limits for the air number and the exhaust gas amounts corresponding to this air number, apply separately for the air component and the exhaust gas component of the air-exhaust gas mixture.

The air number $\lambda_{23}$ for the combustion of the fuel gas mixture in the combustion chambers of the internal-combustion engine is obtained by the equation $$S + \lambda_{23} L_S \rightarrow A \tag{6}$$

Here, $L_S$ is the amount of air required for stoichiometric combustion of the fuel gas quantity $S$. $\lambda_{23}$ is therefore also the ratio of the amount of air actually supplied to the internalcombustion engine to the amount of air required for stoichiometric combustion of the fuel gas mixture fed to the internal-combustion engine. Since $L_S = (1 - \lambda_{12}) L$, the following relationship exists between the different air numbers $$\lambda_{23} = (\lambda_{13} - \lambda_{12})/(1 - \lambda_{12}) \tag{7}$$

According to the invention, $\lambda_{23}$ should be at least equal to 1.

As background in understanding to the above equations it is noted that, the amount of air necessary for stoichiometric combustion of one mol of fuel of the composition $C_n H_{2m}$ is given by the equation $L = (n + m/2) (O_2 + 4 N_2)$ and that the amount of exhaust gas generated is, $A = nCO_2 + mH_2O + 4(n + m/2) N_2$.

Although the air number for the reaction in the gas generator can fall in the range of 0.05 to 0.5, it has been found most advantageous if the operational air number lies within a more restricted range. Preferably, the fuel fed to the gas converter is mixed with so much air and/or exhaust gas, that for the air component of the mixture the air number $\lambda_{12}$ for the reaction in the gas converter is in the range of 0.07 to 0.3 and that the exhaust gas share, if any, is between the exhaust gas quantities equivalent to the air numbers 0.07 and 0.3, respectively. An air number $\lambda_{12}$ below 0.3 is particularly advantageous, because the losses in calorific value of the fuel during conversion in the gas converter are approximately proportional to the air number $\lambda_{12}$ down to 0.3, whereas below this value the losses are lower. In the range of $\lambda_{12}$ below 0.3 endothermic cracking reactions take place to an increasing degree, which consume again a part of the heat generated during conversion for the formation of products of a higher calorific value. It is, therefore, still more advantageous, if the fuel fed to the gas converter is mixed with so much air, that the air number $\lambda_{12}$ is in the range of 0.09 to 0.2, and if the exhaust gas share, if any, is between the exhaust gas quantities equivalent to the air numbers 0.09 and 0.2, respectively. On the one hand soot formation is prevented reliably and on the other hand a fuel gas of a very high calorific value is produced in this range of $\lambda_{12}$. Operating with an air number $8O_{12}$ of about 0.1 is especially favourable. Air number values outside of the 0.05 to 0.5 range, on the low end, do not guarantee soot-free operation and on the high end result in inadequate conversion of the liquid fuel to fuel gas.

As can be seen from Eq. (7) above, the overall air number $\lambda_{13}$ for the reaction of the fuel in the gas generator and the subsequent combustion in the engine is always greater than 1 for an air number $\lambda_{12}$ of at least 0.05 and an air number $8O_{23}$ of at least 1. Although this overall air number can be greater than 1 according to the invention, it should not exceed the value 2. This is so because with an overall air number of more than 2 so much air remains in the exhaust gas produced that the reaction of the fuel with fed-back exhaust gas in the reformed-gas generator takes place exothermically and control of the temperature of the reaction chamber in the generator is no longer possible. Thus only as much additional air should be admixed to the fuel gas mixture, prior to feeding it to the engine, that the overall air number $\lambda_{13}$ for the reaction of the fuel in the generator and the following combustion in the engine is at most equal to 2. This is further restricted, however, for the following reasons.

Although such a high air number can have a beneficial effect on the operation of the engine, a limitation on the additional air admixed to the fuel gas mixture, prior to feeding it to the combustion chambers of the engine exists. This is particularly the case for the operation of Otto engines in motor vehicles, which are designed for a low weight-per-horsepower ratio. It has been found that because of the above only so much additional air should be provided such that the air number ($\lambda_{23}$) for the combustion in the combustion chambers of the engine is between about 1.0 and 1.3. With a higher air number, insufficient fuel gas would be present resulting in a drop-off of the power output.

Referring now to FIG. 1 the apparatus shown is comprised essentially of a reformed-gas generator 1, a starting device 2 preceding the reformed-gas generator, a central electronic control and regulating device 3 and an internal-combustion engine 4 with an air intake line 5, which includes an air filter 6 at its inlet opening. A plurality of highly porous sintered bodies 58, are arranged in the reaction chamber 7 of the gas generator 1. These contain the catalyst and are provided with passage openings, designated as 8. The operation of the reaction chamber portion of the generator is as described in the references cited above. The air required to generate the fuel gas in the gas generator 1 is drawn-in by the internal-combustion engine 4 through the filter 6 and then through the air line 9 into the mixing chamber 10. Prior to entering the mixing chamber 10, the air passes through a heat exchanger 11, which is heated up by the hot fuel gas mixture leaving the reaction chamber 7. The fuel to be fed to the reformed-gas generator is injected by means of an injection valve 12 into a further heat exchanger 13, wherein the fuel is vaporized and thereafter conducted into the mixing chamber 10 via line 14. The vaporized fuel and air are mixed and then fed to the reaction chamber 7, for conversion to fuel gas. The fuel gas mixture leaving the reformed-gas generator 1 after passing through the two heat exchangers, is further cooled in a coller 14a, supplied by air or water through line 59. This cooling reduces the volume per mass of the fuel gas mixture further and the filling factor of the internal-combustion engine is increased. The fuel gas mixture is then fed via the fuel gas line 15 to the air intake line 5 of the engine and is mixed there with the air necessary for combustion.

Between the entrance opening of the air intake into line 5 and the entrance of the fuel gas line 15 there is arranged an air valve 16, whose pressure loss characteristic is matched to the pressure loss characteristic of the reformed-gas generator 1 through this matching of the pressure loss characteristic, the ratio of the fuel gas volume drawn in by the internal-combustion engine from the fuel gas line 15 to the air volume drawn in through the air intake can be set in a simple manner and can be kept at least approximately constant during the operation of the engine. As noted earlier the valve 16 is set such that the air number $\lambda_{23}$ is between 1.0 and 1.3. Between the entrance of the fuel gas line 15 into line 5 and the engine 4 a throttle 17 is arranged, which is operated by a gas pedal 18.

As already mentioned, the temperature in the reaction chamber 7 of the gas generator can advantageously be controlled by changing the ratio of the amounts of exhaust gas and air to be fed to the reformed-gas generator. The temperature in the reaction chamber of the reformed-gas generator can be kept constant by increasing the exhaust gas share in the air-exhaust gas mixture to be supplied if the actual temperature exceeds the desired temperature, and by decreasing it if the actual temperature deviates downward from the desired temperature.

The exhaust gas leaves the internal-combustion engine 4 via a line 19. Part of the exhaust gas can be admixed to the air fed through the line 9 to the reformed-gas generator 1 via a feedback line 20. The amount of fed-back exhaust gas is set by a metering device 21, such as an adjustable valve or an adjustable vane.

The opening of the valve is controlled by the temperature control regulating circuit 31 which, employing known electronic elements, detects the temperature of the reaction chamber via sensor 38 and line 39, compares it to the voltage analog of a predetermined temperature and actuates a positioning motor 44 in response to the difference in the temperatures. Since the exhaust gas is present at the metering device 21 at a certain pressure, it flows into the air line 9 under pressure resulting in less air being drawn into the line 9. Thus part of the air fed to the reformed-gas generator is replaced by exhaust gas. Since the temperature in the reaction chamber 7 can fluctuate within a certain range, depending to a large extent on the catalyst used, the regulator 31 can be designed so that the exhaust gas metering device 21 is adjusted only if the difference between the desired temperature and the actual temperature exceeds a definite value.

This metering device 21 is advantageously disposed at or in the vicinity of the entrance of the line 20 into the line 9. This allows for a rapid responding temperature control. It is shown at a different point in FIG. 1 merely for reasons of clarity.

In starting up an engine equipped with a reformed-gas generator, it is important that the reaction chamber of the reformed gas generator be heated to operational temperature as fast as possible. A starting device, such as 2, is employed for this purpose. The mixing chamber 10 of the reformed-gas generator 1 is connected via a line 22 to the starting device 2. This contains a catalyst applied to a highly porous, sintered body 23, suitably provided with passage openings 60. The sintered body 23 has a smaller volume than the total of the sintered bodies 58 and can therefore be heated up faster than the latter. The starting device 2 has its own air inlet 25, which can be shut off by a valve 24, two fuel injection valves 26 and 27 and an ignition electrode 28.

The central electronic control and regulating device 3 includes a starting control 29, a fuel injection control 30 and the temperatue regulator 31, already described. The function of this control and regulating device, which consists of known electronic elements will now be explained.

Upon starting, i.e., when the ignition key is turned and the starter motor is operated, the air valve 16 is first adjusted by the starting control 29 via a line 32 and a solenoid 45 in such a manner that the internal-combustion engine draws in less air through the air valve than in normal operation. This is necessary first in order to compensate for the additional pressure loss of the starting device 2, and second to draw the hot gas produced in the starting device 2 through the reformed-gas generator as fast as possible. This speeds up the heating of the latter. At the same time, the starting control 29 opens the valve 24 at the air inlet 25 via the line 33 and actuates the fuel injection valve 26 via a line 34. The injected fuel is ignited by the ignition electrode 28, which is operated by the starting control 29 via the line 35. The fuel and the air are preferably matched in such a way that the combustion takes place with an air number greater than 1. The hot flame gases produced by the combustion are drawn by the engine 4, driven by the starter motor, through the catalyst 23 and the reformed-gas generator 1. Here the catalyst 23 is first heated to the temperature of, say, 600° to 700° C., which is necessary for generating a fuel gas mixture. When this temperature is reached, the starting control 29 transmits a signal to the fuel injection control 30 via a line 36. The signal can be initiated, for instance, by a measurement of the temperature of the catalyst 23 or, more simply, after a period of fixed time sufficient for heating the catalyst set within the starting control 29. The fuel injection control 30 then actuates the injection valve 27, via a line 37. The latter is set to inject an amount of fuel into the starting device 2, which corresponds approximately to the demand of the internal-combustion engine at idling. The fuel is sprayed in the direction of the surface of the hot catalyst 23 but evaporates before striking it. The injection valve 26 is then turned off, so that the flame burning in the starting device 2 goes out. The air valve 24 is turned down to the point that the air number for the reaction in the starting device is about 0.1. This allows for only partial burning of the fuel. The unburned fuel gas produced in the starting device 2 is drawn through the reformed-gas generator 1 and is used to ignite the engine 4 almost immediately.

The temperature in the reaction chamber of the reformed-gas generator 1 is measured by a temperature sensor 38 which is connected to the starting control 29 by line 39. As soon as a temperature of 600° to 700° C. is reached in the chamber 7, a signal is generated by the starting control 29 and transmitted via line 36 to the fuel injection control 30. The latter in response transmits control pulses via line 46 to the injection valve 12, which injects fuel in a pulsating fashion into the evaporator device 13 which is by now at an elevated temperature. At the same time, the air valve 16 is switched to normal operation. As soon as sufficient fuel is generated in the reformed-gas generator as determined, for example, by a counting of pulses transmitted on line 46, the air valve 25 and the injection valve 27 at the starting device 2 are closed. A shut-off valve 47 is provided in the air line 9 which is closed by the starting control 29 via line 48 at the beginning of the starting operation and is opened only at the start of the fuel injection into the reformed-gas generator.

The amount of gasoline injected by the injection valve 12 into the gas generator 1 is proportional to the demand of the engine 4. As noted earlier control pulses generated in the injection control circuit 30 provide the means for regulating the flow of fuel through the valve 12. The frequency of these pulses is proportional to the engine speed as determined from a signal take-off from the distributor 41 and supplied to the control circuit 30 via line 61. The duration of each pulse, and thus each injection is proportional to the position of the pedal 18 as sensed by the wiper position of potentiometer 40 which is ganged to the pedal and supplied to control circuit 30 via line 62 and inversely proportional to the absolute temperature of the air to be mixed with the fuel gas mixture. The latter input to control circuit 30 is provided by line 63 connected to temperature sensor 42. Further, the pulse duration is also dependent on the position of exhaust gas metering device 21. The wiper of a second potentiometer 43, ganged to the metering device 21, senses this position and supplies an appropriate signal to the control-circuit 30 along line 64.

The control signals generated by the injection control circuit 30 in response to the signals mentioned above are such that the amount of fuel $\dot{M}$, injected into the evaporator device 13 per unit of time is established by the following formula:

$$\dot{M} = nf(n)a_1 p\, 243/T_A (1 - b\, aa_2),$$

where $n$ is the speed of the engine; $f(n)$ is a speed-dependent correction factor, by which the amount of fuel to be injected is reduced in the range of higher speeds in accordance with the reduction of the cylinder filling factor caused by the increased pressure loss at the intake valves of the engine. The correction factor $f(n)$ could for instance, be the following function of $n$: $f(n) = 1 - 10^{-8} n^2$, where $n$ is measured in revolutions per minute (r.p.m.). With this correction factor, the amount of fuel injected is reduced, for instance, at 3000 r.p.m. by the factor 0.91 and at a speed of 6000 r.p.m. by the factor 0.64. Without such a correction factor, there is a danger that the mixture drawn in by the engine will be too rich. This can lead to an undesired increase of engine speed making frequent corrections by means of the gas pedal necessary. The term $a_1$ is proportional to the position of the gas pedal 18 as sensed by the wiper position of potentiometer 40. It can vary from 0 at the rest position of the pedal to 1 for full power. However, it is noted that when the gas pedal is in the rest position, in addition to the amount of fuel $\dot{M}$ given above, an amount of fuel sufficient for idling must be injected into the evaporizer device 13. This can be done by a separate injection valve, but more simply by choosing a value for $a_1$ at the rest position of the gas pedal somewhat above zero suitable to enable the engine to idle. Also required is a minimum amount of air which can be provided by an opening in the throttle 17 or a suitable bypass around the throttle.

$a_1$ can also correspond to the percent opening of the throttle 17 arranged in the intake line 5. In that situation, the throttle is open only for full power, i.e., with the gas pedal 18 all the way down. However, in order to keep the fuel consumption and also the nitrogen oxide content in the exhaust gases as low as possible, particularly in the medium load range, and still obtain an output as high as possible in the high load range, it is advisable to limit the amount of air which is drawn in per stroke above a given threshold engine load and to feed in more liquid fuel. This reduces the air number $\lambda_{12}$ for the reaction in the gas generator and increases the calorific value of the fuel gas mixture generated enabling the power output of the engine to be increased. Thus, below the threshold load the quantity of fuel gas supplied to the engine is varied while above the load the quality of the fuel gas is varied. This can be implemented by operating the throttle 17 by the gas pedal 18 in such a way that it is already fully open before full power is reached, for instance, at 80% of full load (the threshold load) and its position changes no further with a subsequent increase in load. With further movement of the gas pedal 18, only the wiper position of the potentiometer 40 connected with the former changes; the position is then proportional to the throttle position only up to the threshold load. After the throttle is fully-opened, the intake of the engine no longer increases. The total volume of fuel gas and air drawn in by the internal-combustion engine per stroke no longer changes. However, $a_1$ and therefore the amount of fuel injected into the reformed-gas generator, is increased through the further movement of the wiper and its effect on the control circuit 30. Thus the fuel gas mixture generated gains in calorific value. Thus, for the same filling factor, a mixture with a higher calorific value is fed to the internal-combustion engine. In the lower and medium load range up to full opening of the throttle, however, the intake of the internal-combustion engine increases about proportionally to the throttle opening. Thus, corresponding more air and fuel gas is drawn in, but the volume ratio of air to fuel gas and the composition of the fuel gas mixture, and therefore also its calorific value, remain about the same, where the pressure loss characteristic of the air valve 16 is matched accordingly to the pressure loss characteristic of the reformed-gas generator 1.

Because the throttle opening i.e., the flow cross section releases by the throttle in the air intake line 5, is not exactly proportional to the throttle position, to which $a_1$ corresponds in the lower and medium load ranges, somewhat more fuel is again injected into the reformed-gas generator in the lower load range at small throttle opening in relation to the amount of air taken in through the intake line 5 and the reformed-gas generator 1. Thus in the lower load range, the fuel-air mixture fed to the internal-combustion engine is somewhat richer than in the medium load range. This has the advantage that in the lower load range the calorific value of the fuel can be utilized better. Any increased emission of nitrogen oxides is offset in the lower load range because of the lower average pressure of the internal-combustion engine. It has been found advantageous to match the fuel and air amounts in such a manner that in the lower load range, say, for idling, $\lambda_{12} = 0.15$ and $\lambda_{23} = 1.1$, while in the medium range $\lambda_{12} = 0.2$ and $\lambda_{23} = 1.3$, and in the full load range above the threshold load $\lambda_{12}$ is approximately 0.1 and $\lambda_{23}$ about 1.0.

The factor $(1 - b\, a\, a_2)$ in the above formula takes into consideration the reduction of the fuel demand which results when exhaust gas is combined with the fuel. The term $a_2$ corresponds here to the volume percentage of the exhaust gas in the exhaust gas-air mixture fed to the reformed-gas generator. By making the exhaust gas pressure present at the exhaust gas metering device 21 appropriate, $a_2$ may, for instance, be proportional to the opening of the exhaust gas metering device 21 and can be detected by the wiper of potentiometer 43. Thus the air fed to the reformed-gas generator is completely replaced by exhaust gas, $a_2$ is then equal to 1, and without exhaust gas feedback, $a_2 = 0$.

The factor $a$ indicates the extent to which the exhaust gas reacts in the reformed-gas generator 1. This depends on the catalyst and on the volume of the catalyst in the reformed-gas generator. As a rule, most catalyst prefer to react with air and react with exhaust gas only to the extent that the catalyst volume and the catalytic activity with air permit. For complete reaction of the exhaust gas, $a$ would equal 1; if no exhaust gas reaction took place, $a$ would equal 0. A realistic value for $a$ would be 0.7.

The factor $b$ indicates the maximum percentage fuel saving that occurs for the case where only exhaust gas is fed to the reformed-gas generator and the former is completely reacted. As may be seen from the equations (2) and (4) given at the outset, where exhaust gas is used in the reaction the same quantity of reformed-gas can be generated from the amount of fuel, $$\frac{\lambda_{13} - \lambda_{12}}{\lambda_{13}} B$$

as from the amount of fuel B in reaction with air. The percentage-wise fuel saving through replacing air with exhaust gas is therefore $b = \lambda_{12}/\lambda_{13}$.

The quantity $b$ could be measured, for instance, by measuring $\lambda_{12}$ and $\lambda_{13}$ by means of suitable oxygen probes, but as a rule it will be sufficient as, an approximation, to use a value for $b$ determined by fixed average values of $\lambda_{12}$ and $\lambda_{13}$ as they occur in operation. A realistic value for $b$ would be 0.125. Since the maximum fuel saving using all exhaust gas is below 10% under normal operating conditions the exhaust gas share of the formula, i.e., the factor $(1 - b\, a\, a_2)$, can be ignored in some cases by the fuel injection control circuit 30.

The factor $243/T_A$ takes into consideration that the density of the air drawn in decreases with increasing temperature $T_A$ (in °Kelvin) and therefore the amount of air drawn in per stroke decreases with increasing temperature, so that the amount of fuel required also decreases. The factor $243/T_A$ is chosen here so that it is equal to 1 at an air intake temperature of $-30°$ C. (243 K). The reference temperature, in this case $-30°$ C., can be another value however.

Finally, the factor $p$, indicates the maximum fuel consumption of the installation consisting of the reformed-gas generator and the internal-combustion engine at the reference temperature $T_A = 243$ K, with the exhaust gas return closed $(a_2 = 0)$ and for low speed $(f(n) = 1)$. The term $p$ is therefore dependent on the properties of the reformed-gas generator as well as on those of the internal-combustion engine and must in each case be chosen so that sufficient fuel is available for full load, i.e., for maximum fuel demand, to obtain in the internal-combustion engine the desired air number $\lambda_{23}$.

The processing of the quantities contained in the formula for M to generate a pulse train to be fed to the injection valves by the fuel injection control 30 will be explained in detail with reference to FIG. 2. This shows a functional diagram of the essentail parts of the fuel injection control 30. This injection control is designed so that the duration of the injection pulses corresponds to the product $$f(n) a_1 p (243/T_A)(1 - b.\, a.\, a_2)$$

and the number of the injection pulses corresponds to the speed $n$. The control device operates as an analog computer with electrical quantities corresponding to the individual quantities provided directly by the sensors previously mentioned or developed by circuitry within 30, not shown, but readily apparent to those skilled in the art. The control consists essentially of a divider stage 100, three multiplier stages 101, 102 and 103, a substraction stage 104, a function generator 105 for the function $f(n)$ and a pulse generator 106. In the divider stage 100, the ratio $1/T_A$ is formed by the fixed entered value 1 and the air intake temperature measured by the thermal sensor 42. This quotient is multiplied by the factor 243 in the multiplier stage 102. The output signal of the multiplier stage 102 (243//T$_A$) is fed to the multiplier stage 103. In the multiplier stage 101 the product $b.a. \alpha_2$ is formed from the fixed, set quantities $b$ and $a$ and the quantity $\alpha_2$ taken from the potentiometer 43. This product is fed to the substraction stage 104, where the difference $1 - b.a.\alpha_2$ is formed. This is also fed to the multiplier stage 103. Also supplied to the multiplier stage 103 are the fixed quantity $p$ and the quantity $\alpha_1$ taken from the potentiometer 40, as well as the quantity $f(n)$ such as the one above, formed in the function generator 105. The product, which is fed to the pulse generator 106, is formed in the multiplier stage 103 from the five input quantities. The speed $n$ taken from the distributor 41 is also supplied to the pulse generator and controls the frequency thereof. The duration of the pulses is a function of the product output of stage 103. The pulse output provides the ignition pulses which are then fed to the injection valve 12 via line 46. Should one injection valve not be enough for the required amount of fuel, two or more injection valves can, of course, be provided, which then would inject a corresponding fraction of the required fuel.

Figure 3:
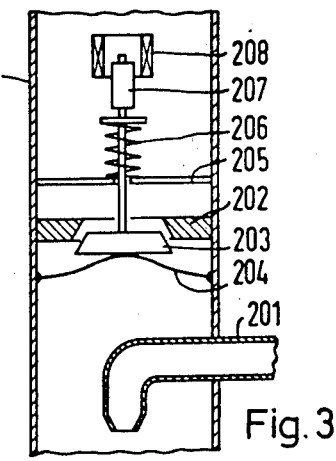
FIG. 3 shows, schematically, in cross-section, an embodiment of a fuel-air mixing device that can be used in the method according to the invention.

A suitable fuel gas-air mixing arrangement will be discussed with reference to FIG. 3. This shows a fuel gas-air mixing device arranged in the air intake line of the internal-combustion engine. The air intake line is designated in the figure by 200, and the fuel gas line that opens into the air intake line, by 201.

For metering the amount of air drawn in by the internal-combustion engine serves an air valve consisting of the valve seat 202 and the valve disc 203, kept close by different springs, e.g. the leaf spring 204 secured to the wall of the intake line 201 as the coil spring 206 braced agasint a support 205 controls the amount of air drawn into the engine. The flow cross section can be adjusted by appropriate design of the spring constant of the springs 204 and 206 and, if necessary, by the inclusion of additional springs, in such a manner that the pressure loss characteristic, i.e., the pressure loss occurring at the air valve for a given vacuum in the air intake line 200 caused by the engine is matched to the pressure loss characteristic of the reformed-gas generator such that the ratio of the gas volume drawn in through the air intake line 200 to that drawn in through the fuel gas line 201 remains approximately constant. In a reformed-gas generator, which contains highly porous sintered blocks having passage openings running parallel to the gas flow, the pressure loss lies approximately between the pressure loss for completely laminar flow and that for completely turbulent flow. For laminar flow, the pressure loss $\Delta$ is proportional to V, for turbulent flow, $\Delta p$ is proportional to $V^2$. In the reformed-gas generators mentioned, a pressure loss of $\Delta p \approx V^{1.4}$ to $V^{1.7}$ usually occurs but the exact value must be determined experimentally in each case. V is the gas volume flowing through the reformed-gas generator per unit time. For changing the valve characteristic during the starting process, there is provided an iron core 207 which is pulled into the coils 208 when the latter is energized by the start-up control 29. The valve opening can be reduced during the starting process, for instance, to one-half of the value required during normal operation.

Figure 4:
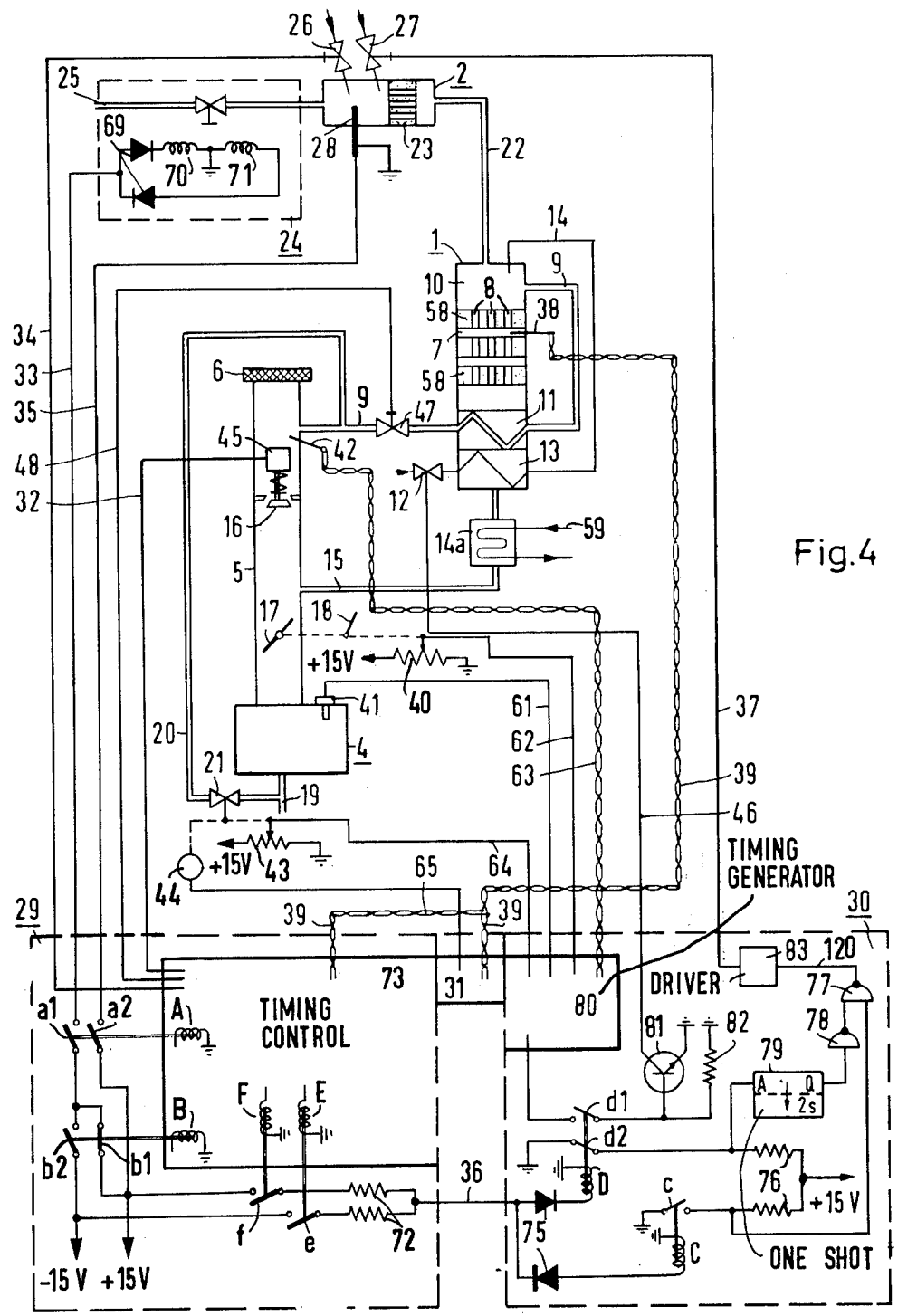
FIG. 4 illustrates the apparatus of FIG. 1 in more detail particularly with regard to electronic switching elements.

FIG. 4 illustrates in more detail the embodiment of FIG. 1. In this figure, elements are given the same reference numerals as in FIG. 1 and only those portions which are added will be described in detail. The temperature sensor 38 in the reaction chamber is a commercially available thermocouple designed for high temperatures. The temperature sensor 42 will preferably be a platinum resistor. Valves 12, 26, 27 and 47 are solenoid valves of the type which open when their magnet coils are energized. Valve 24 is a commercially available solenoid valve having two energizing coils 70 and 71 to give two open positions. Typically, this may be a "Skinner 4-way electromagnetic valve". As illustrated, blocking diodes 69 are placed in series with the coils 70 and 71 so that if a positive voltage is supplied on line 33, only the coil 70 will be energized and the valve 24 will open partially. With the negative voltage, only the coil 71 is energized and the valve 24 is fully opened. If the line 33 has no voltage thereon, both coils remain unenergized and the valve 24 is closed.

Also shown on FIG. 4 is additional detail regarding the fuel injection control means 30 and the starting control 29. As shown, the line 33 leading to the valve 24 is coupled through relay contacts $a1$, and $b1$ or $b2$ to either a positive or a negative voltage. Similarly, the line 36 going from the starting control 29 to the fuel injection control 30 can be coupled to either the positive or negative voltage source by means of the contacts $f$ or $e$ with the voltage being coupled through appropriate resistors 72. With the arrangement, if both switches are closed, a voltage devider is formed to provide a zero voltage on line 36. An additional relay contact $a2$, operated by the coil A, is used to couple the positive voltage supply to line 35 to provide a current to flow to the firing electrode 28. The switches $a1$ and $a2$ are operated by a relay coil A, the switches $b1$ and $b2$ by a relay coil B and the contacts $e$ and $f$ by the relay coils E and F, respectively in accordance with a timing program, programmed into a controller 73, to be described in more detail below in connection with FIG. 5. The position of the switches shown on the figure corresponds to the unenergized states of the relay.

The voltage applied to line 36 passes through blocking diodes 75 to the relay coils C and D, respectively. The negative voltage will energize the relay coil C to close the contact $c$ whereas a positive voltage will energize the relay coil D to open the contact $d2$ and close the contact $d1$. With contact $d1$ closed, positive voltage pulses generated in a timing generator 80, also to be described below, are fed to the base of the switching transistor 81, turning it on and causing current to flow in the line 46 to open the valve 12. With switch $d1$ open, the base of the switching transistor is disconnected from the timing generator and is grounded through a resistor 82, causing the valve 12 to remain closed. The contacts $d2$ and $c$ along with the associated resistors 76 in series therewith, the monostable multivibrator 79, NAND gate 77 and 78 and a solenoid driver 83 are used to control the output on line 37 for driving the injection valve 27. This latter solenoid driver 83 is described in detail in connection with FIG. 12.

The monostable 79 outputs a pulse having a duration of two seconds. In the monostable 79 and all monostables to be described hereafter, a pulse of predetermined duration at a positive voltage level or logical "1" is provided at the Q output starting when the input designated A goes from a "0" to a positive level, i.e., goes from a logical "0" to a logical "1". At all other times, the Q output is a logical "0". The NAND gates shown in this figure and other figures have as their characteristic that they will have a logical "0" output only when all of their inputs are positive or logic "1 *s*". In all other cases, they provide an output at a positive or logic "1" voltage.

In the illustrated circuit, when contact *d2* is closed, the input A at monostable 79 is grounded, and the Q output is at "0". NAND gate 78, having only one input acts as an inverter. Thus, with its input a "0", its output will be a positive voltage or logical "1" which is provided to NAND gate 77. Its second input through resistor 76, with switch *c* open, will also be a positive or logical "1" voltage. With two logical "1" inputs, NAND gate 77 will have a logical "0" output. If the contact *d2* is open, the input A of the monostable 79 has a positive voltage and it will provide an output pulse at a logical "1" level for a duration of two seconds. This positive output voltage is inverted through the NAND gate 78 and appears as a logical "0" at the input to gate 77. Since one of its inputs is no longer a logical "1" there will be a logical "1" pulse output by the NAND gate 77 lasting for two seconds until the Q output of the monoastable 79 goes back to a logical "0" level.

Figure 12:
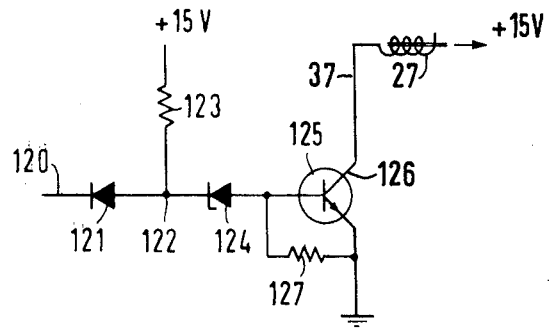
FIG. 12 is a circuit diagram illustrating a solenoid driver which can be used in the embodiment of FIGS. 4 and 5.

The solenoid driver 83 for the valve 27 controls the current necessary for operating the valve. With reference to FIG. 12 where this driver is shown in detail, there is illustrated an input 120, also shown on FIG. 4 which is coupled to the output of the NAND gate 77. This input is coupled through a diode 121 having its anode coupled to a junction point 122 with a resistor 123 leading to a positive voltage and a zener diode 124. The anode of the zener diode is coupled to the base of a transistor 125 having a resistor 127 between its base and emitter. The collector of transistor 125 has its output 126 coupled to line 37 leading to the solenoid of valve 27 and through that solenoid to a positive voltage. The emitter of transistor 125 is grounded. With a zero input on the line 120, the diode 121 is conductive and an essentially zero level also appears at the junction 122. In this state, transistor 125 is cut off. However, when a positive voltage from the gate 77 appears, the diode 121 will be non-conductive. Now at point 122 the positive voltage appears and is conducted through the zener diode 124 to the base of transistor 125 which will be brought into conduction to energize the solenoid valve 27 causing it to open. When the voltage returns to a zero level, the transistor will again be cut off, its base being grounded through the resistor 127. The valve 27 will then be closed.

Figure 5:
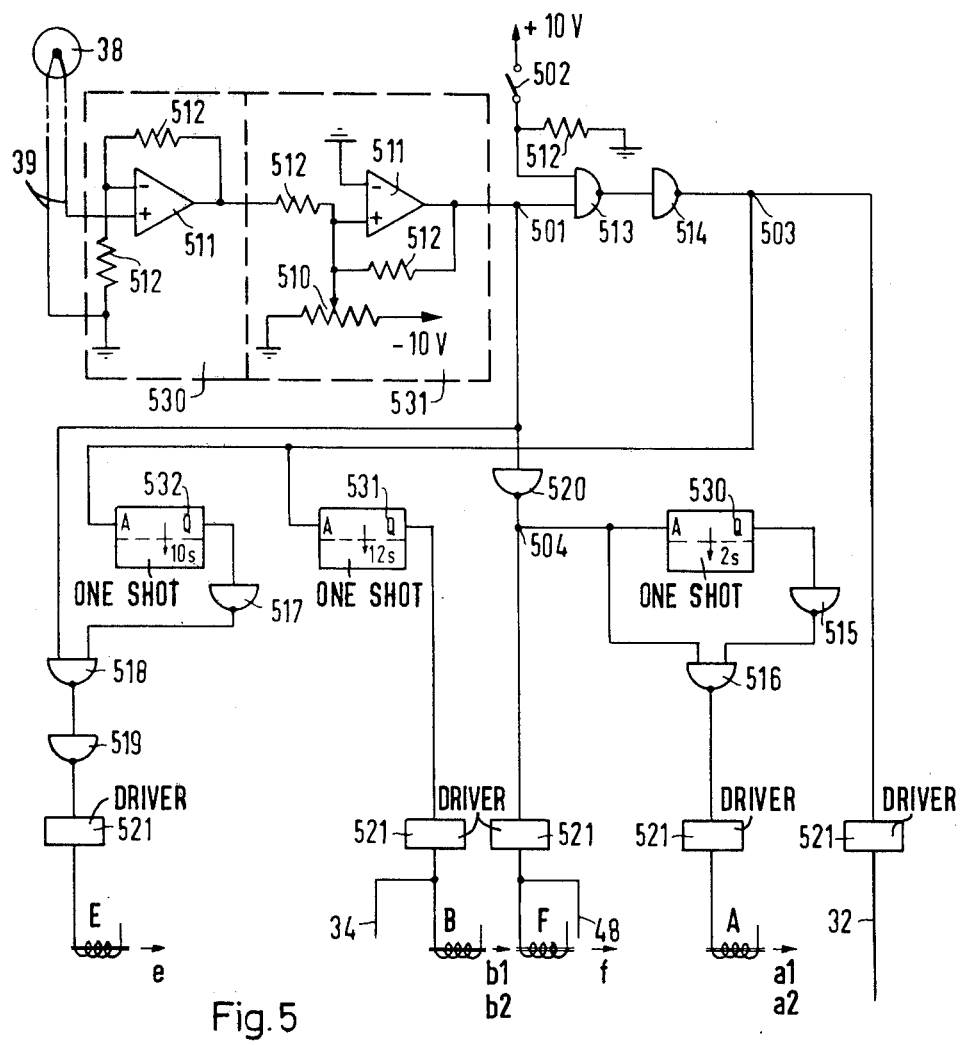
FIG. 5 is a circuit diagram of a portion of a starting control which can be used in the apparatus of FIGS. 1 and 4.

Referring now to FIG. 5, the timing control 73 of the starting control 29 of FIG. 4 is illustrated in more detail. The temperature sensed by the temperature sensor 38 is converted into a voltage which is provided as an input to an amplifying stage 530. The amplifier used herein and the other amplifiers shown on the drawings may be any of many well known types of operational amplifiers such as a Fairchild $\mu$ A 741. Amplifier stage 530 includes an operational amplifier 511 coupled to the temperature sensor in differential manner, with an input resistor and feedback resistor 512 provided in conventional fashion. The output of the amplifier 511 in the stage 530 is provided through another summing resistor 512 to the non-inverting input of another amplifier 511 contained with a comparator stage 531. Also included is a potentiometer 510 connected between a negative voltage and a ground which is used for setting a reference temperature which is differenced with the output from the amplifying stage 530. In the illustrated circuit, a positive voltage will be present at point 501 at the output of stage 531 as long as the actual temperature of the thermocouple 31 has not reached the reference temperature set at the potentiometer 510. When the ignition switch is turned on voltage is supplied to all the various electronics in the system. In addition, appropriate voltages are applied to all the inputs indicated as having voltage supplied thereto on the figures, i.e., FIGS. 4–12. A switch 502 is closed which feeds a positive voltage to a NAND gate 513 having at its output an inverting NAND gate 514. Two NAND gates wired together this way act as an AND gate and will provide a positive output, i.e., from gate 514, when both inputs are positive or a logical "1". During starting, as long as the temperature in the reaction chamber 7 has not reached for reference temperature set in on the potentiometer 510, point 501 will remain at a logical "1" voltage and gate 513 will have two logical "1" signals providing a logical zero output which when inverted through the gate 514 will appear as a logical "1" at the point 503. Point 503 is coupled to a valve solenid driver 521 providing its output to the line 32 for energizing the solenoid valve 45. This solenoid driver along with the other solenoid drivers 521 shown on the figure are constructed in accordance with FIG. 12 described above. Thus, as long as the desired temperature has not been reached, the positive voltage at point 503 will cause the driver 521 to maintain the valve 45 open. The output at point 503 is also provided as an input to two monostable multivibrators 531 and 532. The first of these has a delay time or pulse output period of 12 seconds and the second an output lasting 10 seconds. Immediately upon the closing of the switch 502 and the appearance of a logical "1" or positive voltage at point 503, both of these monostables will be triggered to provide a positive or logical "1" output pulse. Point 501 is also coupled as an input to in inverting NAND gate 520 having its output coupled to a solenoid driver 521 for the line 48 and for driving the relay coil F described above in connection with FIG. 4. The output of gate 520 is also coupled as the A input to an additional monstable 530 having an output lasting 2 seconds. With the positive voltage at point 501, a negative voltage will appear at point 504 at the output of gate 520. This will maintain valve 47, to which line 48 provides a control signal, closed. The relay coil F will remain unenergized. Furthermore, the monostable 530 continues to have a "0" output. This "0" output is coupled to an inverting gate 515. It is inverted therethrough and appears as a positive voltage or logic "1" at the input to NAND gate 516. NAND gate 516 will have a "0" input and a positive or logical "1" input and thus will be providing a logical "1" output. As a result, the driver 521 will be providing an output voltage energizing the relay coil A. This closes contacts *a1* and *a2* of FIG. 4. As a result, voltage is applied to the firing electrode 28 through the contact *a2* and line 34. The positive voltage at the point 503 triggers the monostable 531 causing the driver 521 coupled thereto to output a 12 second driving pulse to the relay B. With relay B energized, a negative 15 volts is provided through the contact *b2* and the closed contact *a1* for a period of 12 seconds. In addition, a positive voltage is coupled on line 34 to the valve 26 opening that valve for 12 seconds. As noted above, the negative voltage on line 33 fully opens the valve 24. The positive voltage at point 503 also triggers the monostable 532 the output of which is inverted through a NAND gate 517 and provided as an input to another NAND gate 518. This NAND gate receives its other input from the point 501. It will thus have a positive, logical "1" input from that point and a logical "0" input from gate 517 thus having a logical "1" output. This output is inverted through the gate 519 appearing as a zero voltage at the input to the solenoid driver 521. As a result the relay E remains unenergized for 10 seconds keeping the contact e open. Thus, there is no voltage on line 36 at this point and, as explained above, the valves 12 and 27 will remain closed.

If the temperature in the reaction chamber 7 has not reached the reference after 10 seconds from the beginning of the starting process, the monostable 532 returns to its quiescent state providing a "0" output which is inverted through gate 517 to be a logical "1". The output of gate 518 now becomes a logical "0" which is inverted through gate 519 to appear as a logical "1" or positive voltage at the input to the driver stage 521. The relay coil E is now energized. This applies a negative voltage to output line 36 which is fed to the fuel injection control 30. As a result, the relay C is energized closing the contact c. This results in the opening of the fuel injection valve 27. Two seconds later, i.e., 12 seconds after the beginning of the starting process, the monostable 531 also returns to its quiescent state. This causes the voltage on line 34 to return to zero level and the relay B to be de-energized. As a result, contact $b1$ is closed and contact $b2$ opened. Now a positive voltage is provided over line 33 causing the valve 24 to go to the partially open position. The output on line 34 having become zero, the fuel injection valve 26 is closed.

The starting operation is completed as soon as the temperature in the reaction chamber has reached the desired temperature of approximately 600°–700° C. At this point, the voltage output from the amplifier stage 530 will exceed the preset voltage and the comparator stage 531 will change its output from a positive to a zero voltage. As a result of this happpening, the voltage at point 503 will also become zero. When this occurs, the coil 45 coupled to line 32 will be de-energized and the valve 16 will open. At the same time, the output 48 from the driver 521 coupled to NAND gate 520 will become positive due to the inversion of the logical "0" signal at point 501 through the gate 520. The valve 47 is thus opened. In addition, the relay F is energized, closing the contact $f$. Monostables 531 and 532 are maintained in their quiescent state. With the "0" output of monostable 532 inverted through gate 517 to be a logical "1" gate 518 will have a logical "0" and a logical "1" input, thus providing a logical "1" output which will be inverted through gate 519 to appear as a zero output at the input of the driver 521. The relay coil E is thus de-energized and contact e opened. There will now appear on the line 36 a positive voltage energizing relay D and opening contact $d2$ while closing contact $d1$. Since the contact c is opened, the monostable 79 will trigger in the above described manner and deliver a 2-second pulse opening the valve 27. Simultaneously, the closing of contact $d1$ will couple the clock or timing generator 80 to the transistor 81 causing an output on line 46 to the valve 12.

Positive voltage is also present at the A input of the monostable 530, causing it to fire and energize the relay coil A for 2 seconds. Because the monostable 531 is not triggered, the valve 26 coupled to the output 34 remains closed and relay coil B unenergized. As a result, the switches $a1$, $a2$ and $b1$ are closed and the switch $b2$ opened. For 2 seconds, i.e., until the monostable 531 goes back to its quiescent state, the firing electrode 28 is supplied with current over the line 29 and a positive voltage remains present on the output line 33. This energizes the coil 70, keeping the valve 24 partially opened. Upon the monostable 530 going back to its quiescent state, the relay coil a is de-energized, there now being two logical "1" inputs at gate 516 causing it to have a "0" output. The firing electrode 28 is now disconnected and the valve 24 closed. At the same time, however, the monostable 79 returns to its quiescent state and switches off the valve 27. As a result, during the following operation, only valves 47 and 16 remain open with the clock or timing generator 80 coupled to the valve 12.

Figure 6:
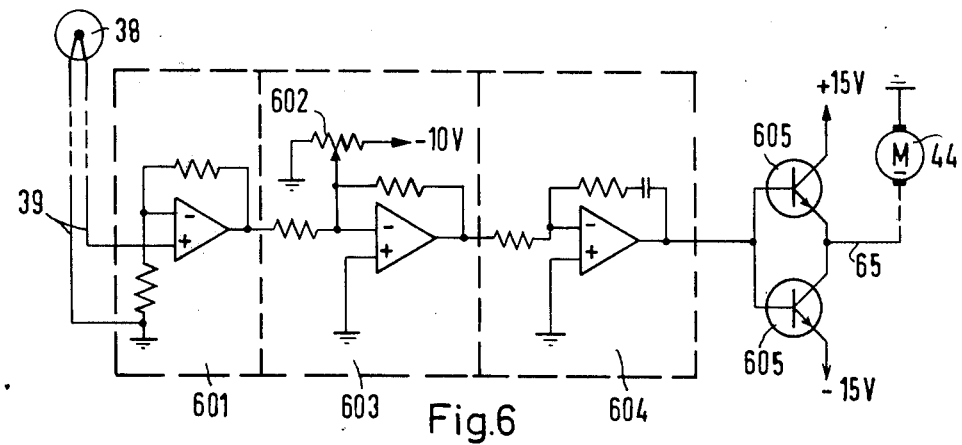
FIG. 6 is a similar drawing of a temperature control.

FIG. 6 illustrates the manner in which the temperature control 31 may be constructed. The voltage from the thermocouple 38 is coupled to an amplifier stage 601 essentially identical to the stage 530 of FIG. 5. The output of this stage is coupled to a stage 603 where it is differenced in an amplifier with a voltage preset in on a potentiometer 602 representing the desired or reference temperature in the reaction chamber. The output of this stage which will represent the difference between the actual temperature and the desired temperature is provided to an integrating stage 64 comprising an amplifier with an input resistor and a capacitor and feedback resistor in its feedback path. The output of the integrator is provided to the bases of a pair of transistors 605 in a push pull stage, the output of which is provided on line 65 to the motor 44 for the valve 21. The current, both in polarity and magnitude, on line 65, will correspond to the sign and magnitude of the deviation of the actual temperature from the desired temperature.

Figure 2:
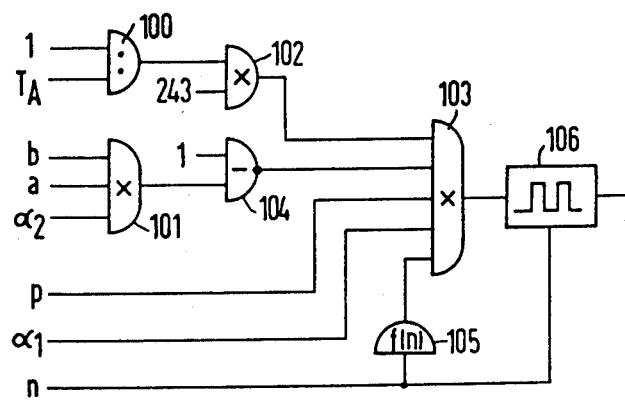
FIG. 2 shows a functional diagram for an electronic fuel injection control that can be used in the method according to the invention.

FIGS. 7 through 11 illustrate design details of the fuel injection control shown in block diagram form on FIG. 2. In all of these drawings, operational amplifiers are designated with the reference numerals 700 and 701. The conventional summing and feedback resistors are designated as 702. Analog multipliers are designated as 712 and 713 and potentiometers as 704 and 705.

Figure 7:
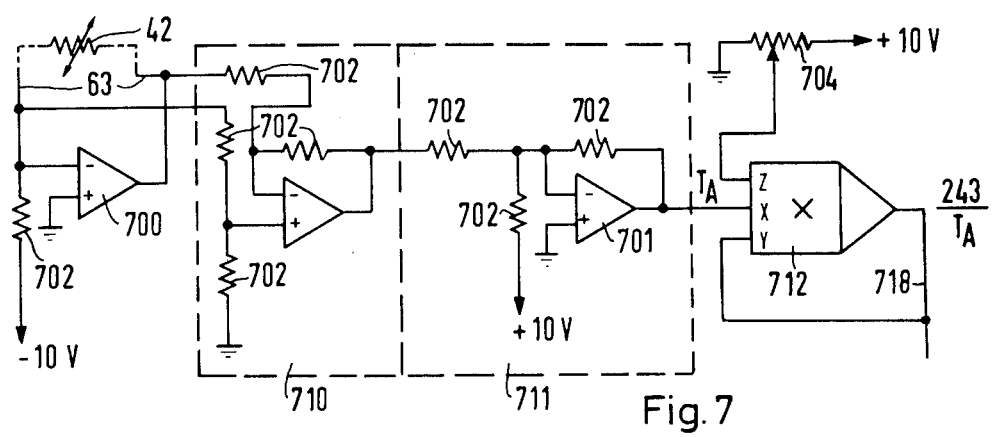
FIGS. 7 through 11 are circuit diagrams illustrating in more detail the implementation of the circuit of FIG. 2.

The arrangement of FIG. 7 can be used to implement the two stage 100 and 102 of FIG. 2. Amplifier 700 is used to impress a current on the sensor 42 over the lines 63. As noted, temperature sensor 42 is preferably a thermal resistor. The voltage drop in this resistor is picked off and coupled through resistors 702 to the amplifier 701 in an amplifier stage 710. The output of this stage is provided to the stage 711 where it is differenced with a reference voltage at the inverting input of the amplifier 701 therein. This forms a temperature difference relative to the reference temperature of the intake air, e.g., −30° C. The difference voltage is then fed to a multiplier 712 coupled as a divider having its Z input coupled to the tap of a potentiometer 704. At the potentiometer 704, a voltage is set in representing the constant 243 or another suitable constant. The output on line 718 thus provides a voltage signal corresponding to the quotient of 243 divided by $T_A$.

Figure 8:
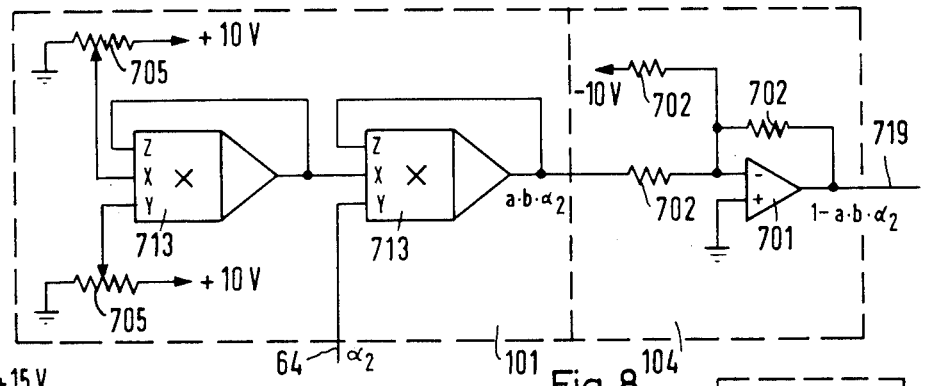

FIG. 8 illustrates the manner in which the stages 101 and 104 of FIG. 2 can be implemented. The potentiometers 705 at the input of multiplier 713 are used to set in the constants $a$ and $b$. In the second multiplier, their product is multiplied by the input on line 64 representing $a_2$. These two multipliers together define a stage 101 the output of which is $a \cdot b \cdot a_2$. This output is provided to a subtracting stage 104 where it is substracted from a reference voltage representing unity at the inverting input of an amplifier 701, Thus, on the output of line 719, there is the quantity $1 - a \cdot b \cdot a_2$.

Figure 9:
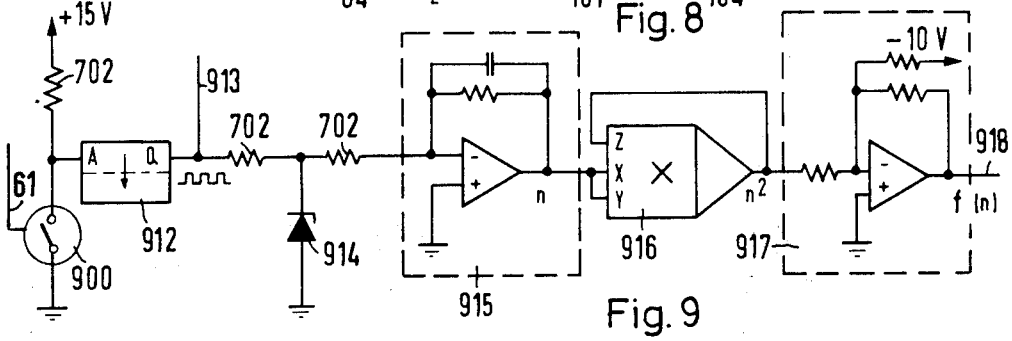

The stage 105 of FIG. 2 may be implemented as shown in FIG. 9. Input 61 which is the quantity N of FIG. 2 representing the r.p.m. of the engine, i.e., will be a series of pulses generated as the engine is sequentially fired is used as a control input for switch 900, preferably an electronic switch. This switch is coupled through a resistor 702 to a positive voltage. Thus, as the switch is opened and closed, the input A to a monostable 912 goes between zero and a positive value. As a result, the Q output of the monostable 912 will provide a pulse train of square pulses having a pulse width and frequency depending on the time constant of the monostable and the speed of rotation of the engine. The pulse duration is substantially shorter than the time during which the input is grounded by the switch 900. Past a branching point 913, the output signal is limited by a zener diode 914. In an integrating filter 915, the pulse train is integrated to form a voltage having a magnitude corresponding to the speed of rotation of the engine. The resulting voltage is squared in a multiplier 916 and then fed to a subtraction stage 917 in which the expression $f(n) = 1 - 10^{-8} \cdot n^2$ is formed. A voltage corresponding to this function is provided on line 918.

Figure 10:
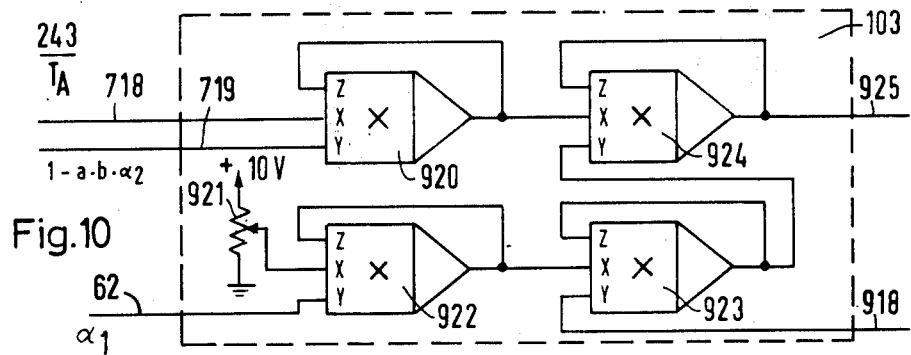
Figure 11:
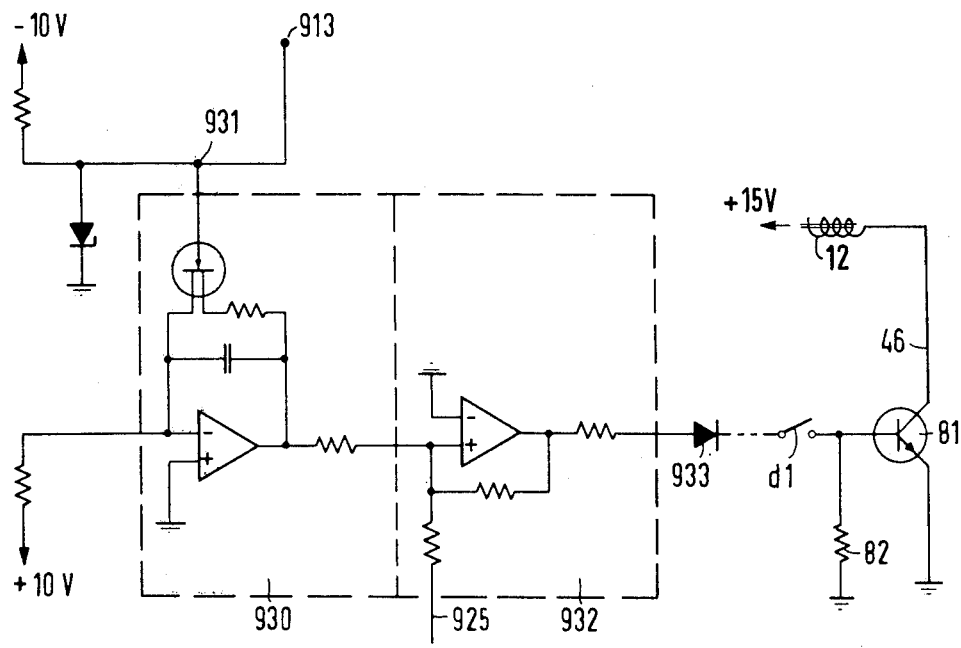

The multiplier 103 in FIG. 2 is illustrated on FIG. 10. The outputs from the units of FIGS. 7 and 8, respectively, are multiplied in a multiplier 920. The quantity $a_1$ is multiplied by a reference voltage $p$, set in on potentiometer 921, in a multiplier 922. The output of multiplier 922 is multiplied by the output on line 918 of FIG. 8 in multiplier 923. That result is multiplied by the output of multiplier 920 in a multiplier 924 to give the final output on line 925. This output is then fed to a pulse generator such as that illustrated by FIG. 11. Included is a sawtooth generator 930 constructed in conventional fashion using an integrator with switching means e.g., field effect transistor 931, in its feedback path for resetting. Resetting is accomplished by an input on line 913 obtained from the branch point illustrated on FIG. 9, i.e., the pulses from the monostable 912 shown thereon. Thus, the sawtooth frequency is synchronized with the motor speed. The sawtooth voltage is provided as an input to a comparator stage where, at the input of an amplifier having positive feedback, it is differenced with the voltage on line 925 of FIG. 10. Initially, at the beginning of the sawtooth a positive output signal is produced at the output of the stage 932. The sign remains positive until the voltage of the sawtooth reaches the value of the voltage present on 925. The output of the comparator then switches. The time of this pulse is thus proportional to this voltage value, i.e., to the expression formed in the arithmetic stages 100 through 105. Negative output signals from the comparator stage 932 are blocked by a blocking diode 933, but the positive output voltages are coupled through to the contact $d1$. If this contact is closed, in the manner described above, a switching transistor is turned on and the fuel injection valve 12 is energized. The valve 12 is thus opened in synchronism with the internal combustion engine, the length of the time it is open corresponding to the expression formed in the arithmetic stages 100 through 105.

As already mentioned, the harmful substances occurring in the exhaust gases of the internal-combustion engine can be lowered to very small values. For instance, the CO content of the exhaust gas is below 0.1% in the entire load range between $\lambda_{23} = 1$ and $\lambda_{23} = 1.3$, while the content of unspent hydrocarbons in the exhaust gas is less than 100 ppm. The nitrogen oxide content of the exhaust gas, particularly in idling operation with $\lambda_{23} = 1.1$, and in partial load operation with $\lambda_{23} = 1.3$, can be kept below 50 ppm and rises to higher values only for full-load operation with $\lambda_{23} = 1$. However, practically speaking this has minimal detrimental effect, since full load is applied as a rule only for short periods while in city traffic, where the emission of harmful substances has a particularly detrimental effect, full-load operation is seldom encountered. Any loss in the calorific value of the liquid fuel used, because of its conversion in the reformed-gas generator, is relatively small particularly for a small air number $\lambda_{12}$. For example, $\lambda_{12} = 0.1$, the energy loss for pure reaction with air is only about 5%. This small energy loss is more than compensated in practice by the better combustion properties of the fuel gas mixture formed.

It is to be appreciated that changes in the above embodiments can be made without departing from the scope of the present invention. For example, instead of monitoring the position of the gas pedal through potentiometer 40, the vacuum in the intake line, which varies as a function of pedal position, can be used to provide a quantity equivalent to $\lambda_1$.

The reformed-gas generator 1 can also be constructed with several stages connected in series. Such a reformed-gas generator was disclosed in U.S. Ser. No. 372,422. While all of the fuel is fed to the mixing chamber ahead of the first reaction chamber, only part of the toal air or the air-exhaust gas mixture to be fed-in is fed to this mixing chamber, while other parts thereof are admixed to the gas mixture flowing through the reformed-gas generator at each of the individual reaction chambers. This has an advantageous effect on the progress of the reaction in the reaction chambers.

Further, the fuel evaporator device 13 can be varied from the embodiment shown in FIG. 1. Another type fuel evaporator device, in which a porous evaporator body is used, is disclosed in U.S. Ser. No. 341,473, filed Mar. 15, 1973.

Other variations of the specific construction disclosed above can be made by those skilled in the art without departing from the invention as defined in the appended claims.

What is claimed is:

1. A method for operating an internal combustion engine which includes a reformed gas generator for converting liquid fuel to fuel gas for the engine by admixing the liquid fuel with a gas containing a predetermined amount of oxygen selected from the group consisting of air, containing oxygen in free form, the exhaust gas of the engine, containing bound oxygen, and a mixture of air and exhaust gas, the gas containing oxygen having an air component of between 0 and 100% and an exhaust gas component complementary thereto, comprising the steps of:
  (a) injecting an amount of the liquid fuel into the gas generator proportional to a predetermined relationship which is in part a function of the fuel gas requirements of the engine;
  (b) supplying the gas containing a predetermined amount of oxygen to said generator such that it contains a total amount of oxygen, which may be in free or bound form, equivalent to an air number $\lambda_{12}$, for a 100% air component in the range of 0.009 to 0.2;
  (c) supplying said fuel gas to said engine; and (d) mixing a quality of air to said fuel gas such that the air number, $\lambda_{23}$, for combustion of said fuel gas in said engine is at least equal to 1.

2. The method of claim 1 where said quality of air mixed to said fuel gas is such that the overall air number, $\lambda_{13}$, for the reaction in said gas generator and the combustion in said engine is no greater than 2.

3. The method of claim 1, including the step of vaporizing said liquid fuel prior to its entry into said gas generator.

4. The method of claim 1, including the step of supplying additional liquid fuel to said fuel gas mixture when said engine exceeds a threshold load.

5. The method of claim 1 further including the step of varying the predetermined amounts of said air and exhaust gas to said generator to thereby control the operating temperature of the reaction chamber of said generator.

6. The method of claim 5 wherein the step of varying said predetermined amounts includes increasing the share of exhaust gas to said generator when said operating temperature exceeds a predetermined temperature and decreasing said exhaust gas share when said operating temperature is less than said predetermined temperature.

7. The method of claim 1 wherein said fuel injected into said generator is less when only a predetermined amount of exhaust gas is supplied to said generator than when only a predetermined amount of air is supplied to said generator.

8. An apparatus for operating an internal combustion engine on fuel gas converted from liquid fuel comprising:
(a) a reformed gas generator including:
  (1) at least one reaction chamber containing a catalyst,
  (2) a fuel evaporator for vaporizing said liquid fuel,
  (3) a mixing chamber, connected to said fuel evaporator,
  (4) air inlet means opening into said mixing chamber for providing a supply of a gas containing oxygen selected from the group consisting of air, engine exhaust gas and a mixture of air and exhaust gas for mixture with said liquid fuel in said mixing chamber;
(b) a fuel gas line connecting said reaction chamber to the air intake line of said engine;
(c) a fuel gas and air mixing means provided in said air intake line, said mixing means having a pressure loss characteristic matched to the pressure loss characteristic of said generator;
(d) first temperature sensing means positioned in said air intake line;
(e) means for detecting the speed of said engine;
(f) pedal means for controlling the fuel gas and air flow into said engine, said pedal means including means for determining the position of said pedal;
(g) control circuit means responsive to said first temperature sensing means, said speed detecting means and said pedal position means, to thereby generate control signals for regulating the flow of liquid fuel to said vaporizer;
(h) second temperature sensing means for detecting the temperature of said reaction chamber;
(i) engine exhaust gas supply means;
(j) regulating means connected to said exhaust gas supply means and said air inlet means responsive to said second temperature means to thereby change the mixing ratio of said air and exhaust gas mixture in said inlet means.

9. The apparatus of claim 8 wherein said regulating means includes a control means at the entrance of said exhaust gas supply means into said regulating means to thereby change the in flow cross section of the exhaust gas into said air inlet means.

10. The apparatus of claim 9 wherein said control means includes means for identifying the position of said control means, said control circuit means also responsive to said control means position in controlling the flow of liquid fuel.

11. The apparatus of claim 8 further including a throttle positioned in said air intake line wherein said fuel gas line enters said air intake line between said throttle and the opening to said air intake line; and wherein said apparatus further includes air valve means positioned between the entrance of said fuel gas line and said intake line opening, said valve includes spring means for providing a pressure loss characteristic matched to the pressure loss characteristic of said generator.

12. The apparatus of claim 8 further comprising:
(a) starting means connected to said mixing chamber, including:
  (1) a reaction chamber which contains a catalyst having a smaller volume than the one associated with said generator,
  (2) a second air inlet means,
  (3) at least one fuel inlet, said second air inlet means and said fuel inlet means including shut-off means; and
(b) starting control circuit means adapted to respond to the starting of said engine to thereby turn on said second air inlet means and said fuel inlet until said reaction chamber in said generator reaches a predetermined temperature, and then switches on the liquid fuel supply to said generator.

13. The apparatus of claim 12 wherein the air valve means includes means responsive to said starting control circuit means for decreasing the free flow cross section of said air valve means during the operation of said starting device.

14. A method for operating an internal combustion engine which includes a reformed gas generator for converting liquid fuel to fuel gas for the engine by admixing the liquid fuel with a gas containing a predetermined amount of oxygen selected from the group consisting of air, the exhaust gas of the engine and a mixture of air and exhaust gas, the gas containing oxygen having an air component of between 0 and 100% and an exhaust component complementary thereto, comprising the steps of:
(a) injecting an amount of the liquid fuel in a vaporized form into the gas generator proportional to a predetermined relationship which is proportional to the position of a gas pedal regulating the flow of the fuel gas to the engine and the speed of the engine and inversely proportional to the absolute temperature of the air to be mixed with the fuel gas mixture;
(b) supplying the gas containing a predetermined amount of oxygen to said generator such that it contains an amount of oxygen equivalent to air number $\lambda_{12}$, for a 100% air component, in the range of 0.07 to 0.3;
(c) supplying said fuel gas to said engine; and (d) mixing a quantity of air to said fuel gas such that the air number, $\lambda_{23}$, for combustion of said fuel gas in said engine is at least equal to 1.

15. The method of claim 14 where said fuel is injected into said generator by a plurality of pulse injections, where the number of pulses of said injections is proportional to the speed of said engine and the duration of each injection is proportional to the position of said gas pedal and inversely proportional to said absolute temperature.

16. The method of claim 14 where said predetermined relationship includes a term, $f(n)$, dependent on said engine speed which reduces the amount of said injected fuel as said engine speed increases.

17. A method for operating an internal combustion engine which includes a reformed gas generator for converting liquid fuel to fuel gas for the engine by admixing the liquid fuel with a gas containing a predetermined amount of oxygen selected from the group consisting of air, the exhaust gas of the engine and a mixture of air and exhaust gas, the gas containing oxygen having an air component of between 0 and 100% and an exhaust component complementary thereto, comprising the steps of:
    (a) injecting an amount of the liquid fuel into the gas generator proportional to a predetermined relationship which is in part a function of the fuel gas requirements of the engine;
    (b) supplying the gas containing a predetermined amount of oxygen to said generator such that it contains an amount of oxygen equivalent to air number 80 $_{12}$, for a 100% air component in the range of 0.07 to 0.3;
    (c) supplying said fuel gas to said engine;
    (d) mixing a quantity of air to said fuel gas such that the air number, $\lambda_{23}$, for combustion of said fuel gas in said engine is at least equal to 1;
    (e) limiting said predetermined amount of said gas containing oxygen supplied to said generator per engine stroke to the amount at a predetermined threshold load; and
    (f) continuing the injecting of said liquid fuel above said threshold load such that $\lambda_{12}$ is decreased.

18. The method of claim 17 where $\lambda_{12}$ is reduced to substantially 0.1 when said threshold load is exceeded.

19. A method for operating an internal combustion engine which includes a reformed gas generator for converting liquid fuel to fuel gas for the engine by admixing the liquid fuel with a gas containing a predetermined amount of oxygen selected from the group consisting of air the exhaust gas of the engine and a mixture of air and exhaust gas, the gas containing oxygen having an air component of between 0 and 100% and an exhaust component complementary thereto, comprising the steps of:
    (a) supplying a predetermined amount of liquid fuel and air to a starting device, having less catalytic material than said generator, connected to the reaction chamber of said generator;
    (b) igniting a mixture of said fuel and air supplied to said starting device, said ignited mixture being drawn through said starting device and said generator until the catalytic material of said starting device has reached a predetermined temperature and then;
    (c) reducing the air number of the reaction in said starting device such that a fuel gas mixture is generated by said starting device, said latter fuel gas mixture being drawn through said generator into said engine for combustion until the catalytic material of said generator reaches a predetermined temperature, then;
    (d) turning off the supply of said air and fuel to said starting device, then;
    (e) injecting an amount of the liquid fuel into the gas generator proportional to a predetermined relationship which is in part a function of the fuel gas requirement of the engine;
    (f) supplying the gas containing a predetermined amount of oxygen to said generator such that it contains an amount of oxygen equivalent to air number $\lambda_{12}$, for a 100% air component in the range of 0.07 to 0.3;
    (g) supplying said fuel gas to said engine; and
    (h) mixing a quantity of air to said fuel gas such that the air number, $\lambda_{23}$, for combustion of said fuel gas in said engine is at least equal to 1.

20. The method of claim 19 wherein the amount of air supplied to said starting device is apportioned such that only partial burning of said liquid fuel takes place initially such that the unburned portion thereof, after passing through said starting device and said generator are burned in said engine.

21. The method of claim 19 wherein said predetermined amount of air drawn in by said engine and supplied to said generator is less during the starting process than during normal operation.

* * * * *